April 23, 1963 F. TUCZEK 3,086,786
FLUID SUSPENSION FOR AUTOMOBILES WITH PNEUMATIC STABILIZERS
Filed April 6, 1960 4 Sheets-Sheet 1

Inventor:
Franz Tuczek
Bailey, Stephens & Huettig
Attorneys

Inventor:
Franz Tuczek
Bailey, Stephens & Huettig
Attorneys

April 23, 1963 F. TUCZEK 3,086,786
FLUID SUSPENSION FOR AUTOMOBILES WITH PNEUMATIC STABILIZERS
Filed April 6, 1960 4 Sheets-Sheet 4

INVENTOR
FRANZ TUCZEK

United States Patent Office 3,086,786
Patented Apr. 23, 1963

3,086,786
FLUID SUSPENSION FOR AUTOMOBILES WITH PNEUMATIC STABILIZERS
Franz Tuczek, Eitorf, Sieg, Germany, assignor to Boge G.m.b.H., Eitorf, Sieg, Germany, a corporation of Germany
Filed Apr. 6, 1960, Ser. No. 20,395
Claims priority, application Germany Apr. 8, 1959
19 Claims. (Cl. 280—6.11)

The present invention relates to a fluid suspension, particularly for automobiles and similar vehicles, in which the forces which are exerted upon the wheels of the automobile are transmitted by mechanical or hydraulic means to a central resilient suspension unit which is provided with work chambers which are subjected to the load of air or gas cushions under a high initial pressure.

The fluid suspensions which were known prior to this invention had the disadvantage that, due to the very yielding resilience afforded by them, the car body would side-tilt too strongly when the car was being driven along a curve. For this reason, it has been necessary to provide the cars which were equipped with such fluid suspension units with additional mechanical stabilizers.

It is an object of the present invention to provide a fluid suspension unit, especially for automobiles or similar vehicles which will give the car a considerable side-tilt stability by opposing the pivotal movements of the opposite wheels on the same axle in the same direction by a small resistance and by opposing such movements of the two wheels in different directions by a great resistance.

For attaining this object, the present invention provides a fluid suspension unit which comprises a pair of stepped cylinders with a pair of separate work chambers in each cylinder and a stepped piston slidable in these work chambers of each cylinder. The smaller circular surface of each piston is adapted, either by mechanical or hydraulic means, to take up the forces which are exerted upon one of the two wheels on the same axle, and the annular work chamber of each cylinder in which negative cushioning forces are produced communicates with the work chamber in the other cylinder in which the larger circular surface of the other stepped piston which is associated with the other wheel is adapted to produce positive cushioning forces. The work chambers of each cylinder which thus communicate with those of the other cylinder are then acted upon by the high pressure of separate air or gas cushions which do not communicate with each other.

A suspension unit of such a design has the advantage that, when driving along a curve, the stabilization will occur hydraulically since the increased load upon the wheel facing toward the outside of the curve will be utilized for relieving the load on the wheel facing toward the inside of the curve. It is thus possible to omit entirely any additional mechanical stabilizers. The small change in resilience required when both wheels on the same axle swing in the same direction is attained according to the invention in such a manner that the change in volume of the air cushion is effected only by the smaller circular surface of each stepped piston, while when the two wheels swing in opposite directions, the changes in volume of the air cushion are produced by the larger circular surface of one stepped piston in cooperation with the annular surface of the other piston.

These and further objects, features, and advantages of the present invention will become more apparent from the following detailed description thereof, particularly when the same is read with reference to the accompanying drawings, in which—

Figure 3:
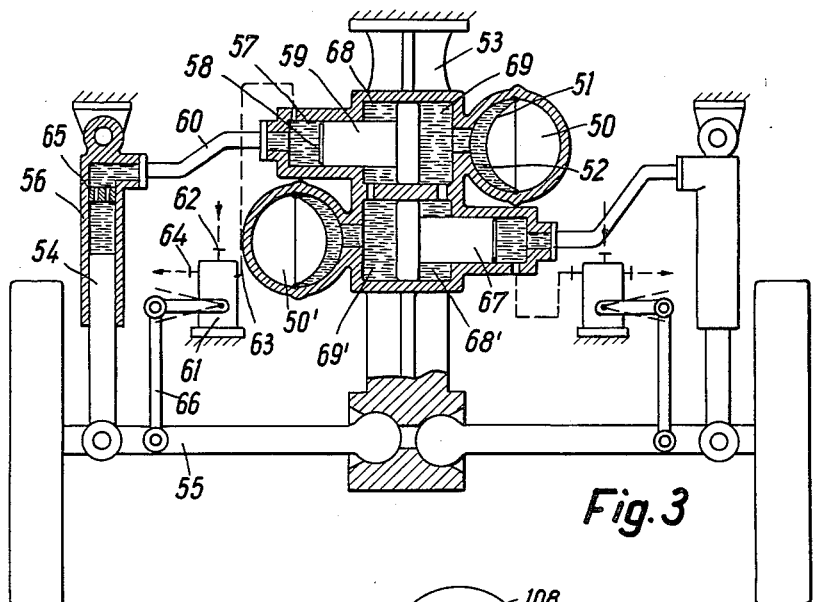
Figure 4:
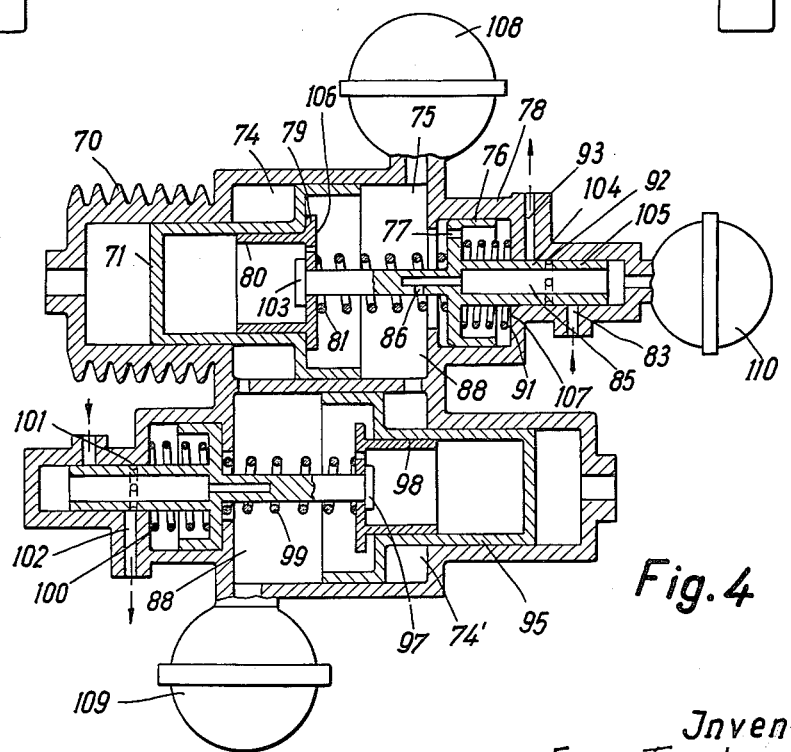

FIGURE 3 shows a view, largely in cross section, of a modification of the suspension unit according to the invention in which the forces acting upon the wheels are transmitted by hydraulic means, and provided with an elevation control for regulating the amount of oil contained in the chambers and conduits between each wheel and the suspension unit; while FIGURE 4 shows an enlarged cross section of a suspension unit similar to that of FIGURE 3 but provided with means for automatically returning the stepped pistons to their central position.

Figure 5:
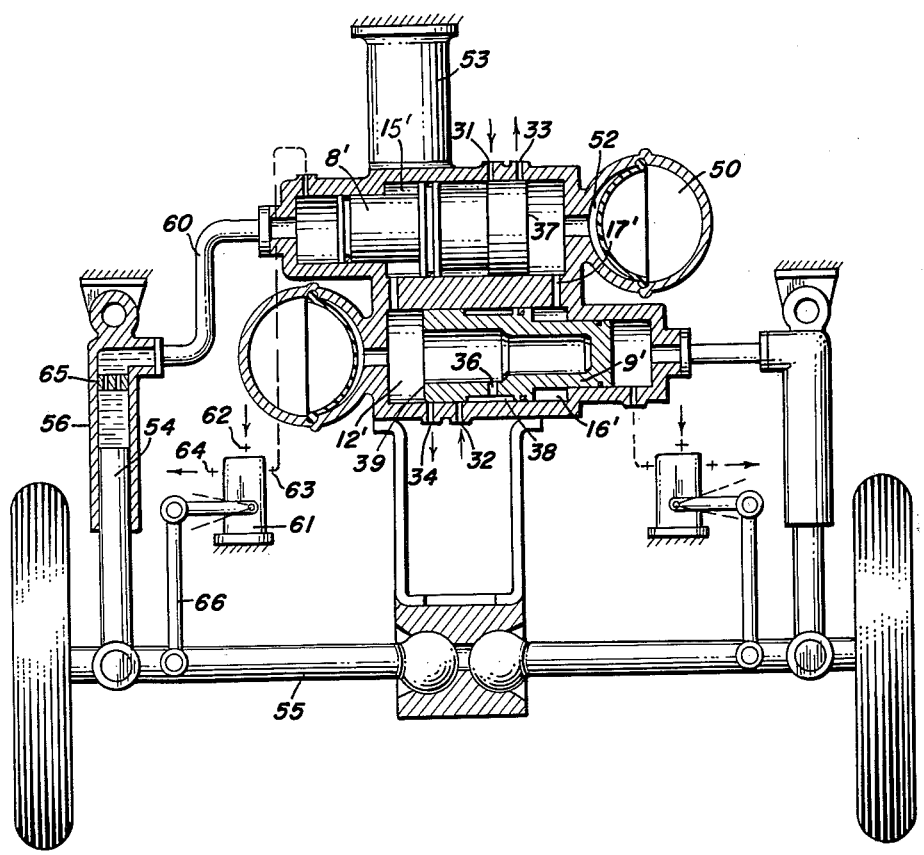
Figure 6:
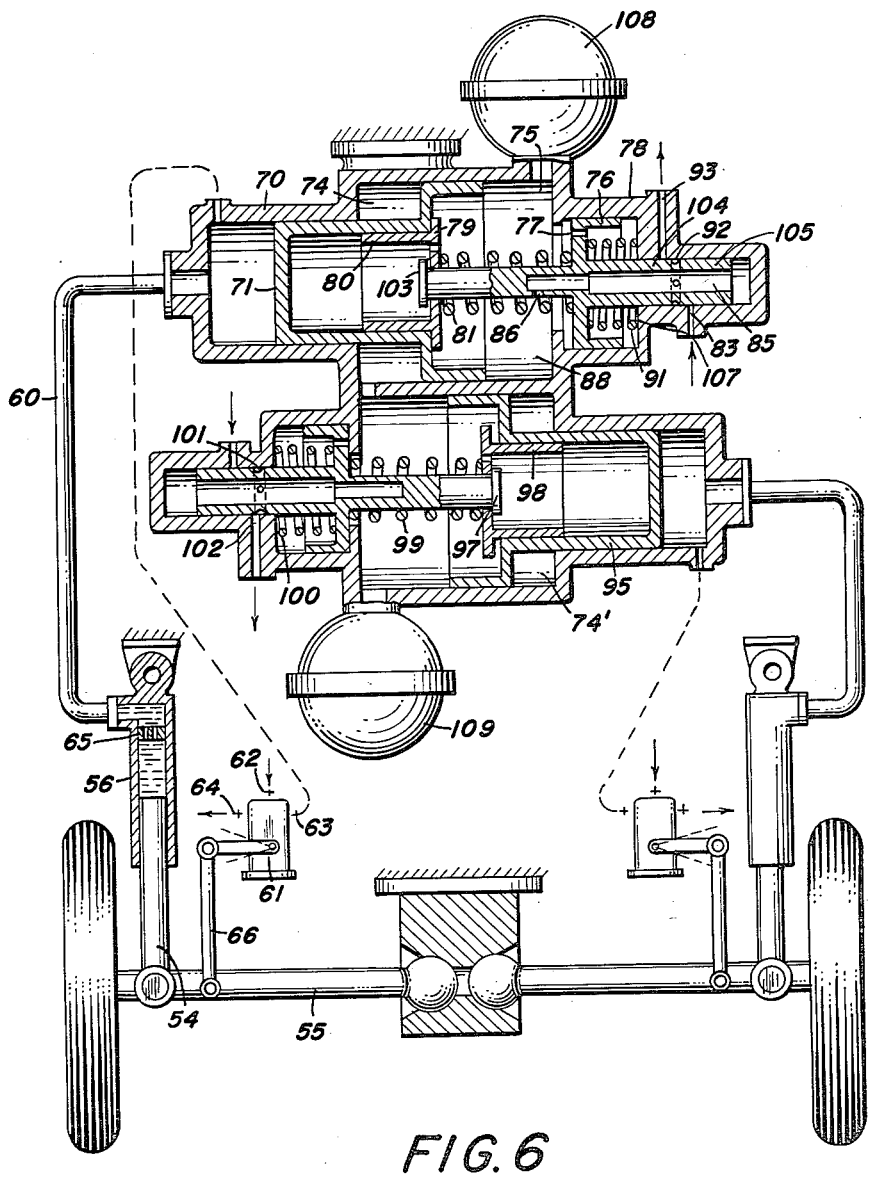

FIGS. 5 and 6 show further modifications.

Figure 1:
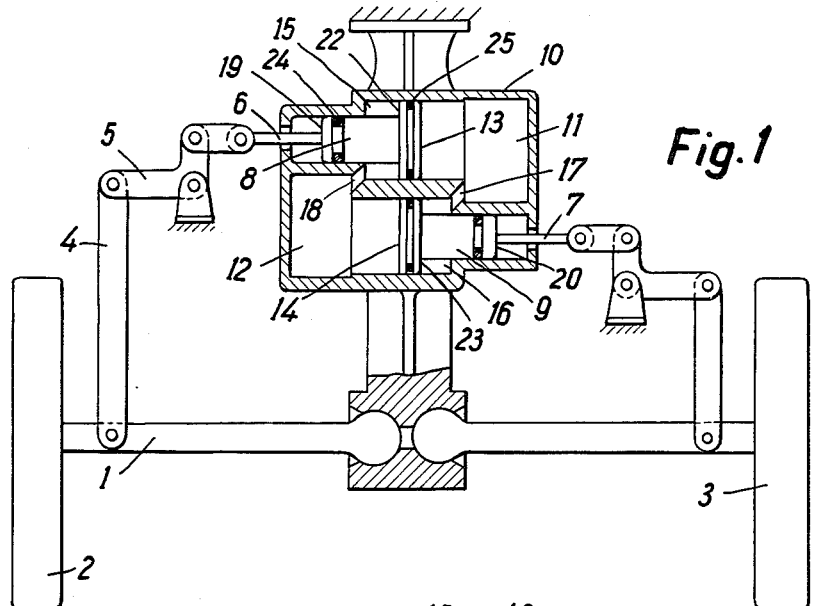
FIGURE 1 shows a diagrammatic view, partly in cross section, of the suspension unit according to the invention, in which the forces acting upon the wheels are transmitted mechanically.

Referring first particularly to FIGURE 1 of the drawings, the wheels 2 and 3 of an automobile are mounted on separate pivotable half-axles 1 which are connected by connecting rods 4, bell cranks 5, and piston rods 6 and 7 to the stepped pistons 8 and 9 of the suspension unit 10. The larger circular front surfaces 13 and 14 of pistons 8 and 9 which are sealed from the rear parts thereof by rings 24 and 25 are acted upon by air or gas cushions 11 and 12, respectively, and are adapted to produce positive cushioning forces. The annular work chambers 15 and 16 of the cylinders containing pistons 8 and 9 communicate through channels 17 and 18 with air or gas cushions 12 and 11, respectively, and are adapted to produce negative cushioning forces. In the position of the pistons as illustrated in FIGURE 1, the pressure is equal in both air cushions 11 and 12, provided that the load upon both wheels 2 and 3 is also equal. The size of the effective piston surface of each piston is then determined by the size of the larger circular surface 13 or 14 minus that of the annular surface 22 or 23 in the annular work chamber 15 or 16, respectively. The effective size of the piston surface is therefore equal to the size of the smaller circular rear surface 19 or 20, respectively. If both wheels 2 and 3 swing in the same direction, the pressure in air cushions 11 and 12 will be either equally increased or decreased and the pressure acting upon both pistons will therefore remain the same. The effective size of the piston surfaces therefore also remains equal to the size of the smaller circular surfaces 19 and 20. If the two wheels swing in different directions, that is, for example, if wheel 2 swings upwardly, while wheel 3 swings downwardly, air cushion 11 will be compressed by the movement of the larger circular surface 13 of piston 8 and also by the movement of the annular surface 23 of the other piston 9, and air cushion 12 will be released by the movement of the larger circular surface 14 of piston 9 and the movement of the annular surface 22 of piston 8. The pressure then increases in air cushion 11 and decreases in air cushion 12 to a greater extent than if the two wheels were swinging a similar distance in the same direction. The cushioning forces which become effective at wheel movements in opposite directions are composed of the positive forces acting upon the circular piston surface 13 or 14 minus the negative forces acting upon the annular surfaces 22 or 23, respectively, and they result in a strong increase of the cushioning forces of wheel 2 and a strong decrease of the cushioning forces of wheel 3 so that the desired stabilization will be attained when driving along a curve.

Figure 2:
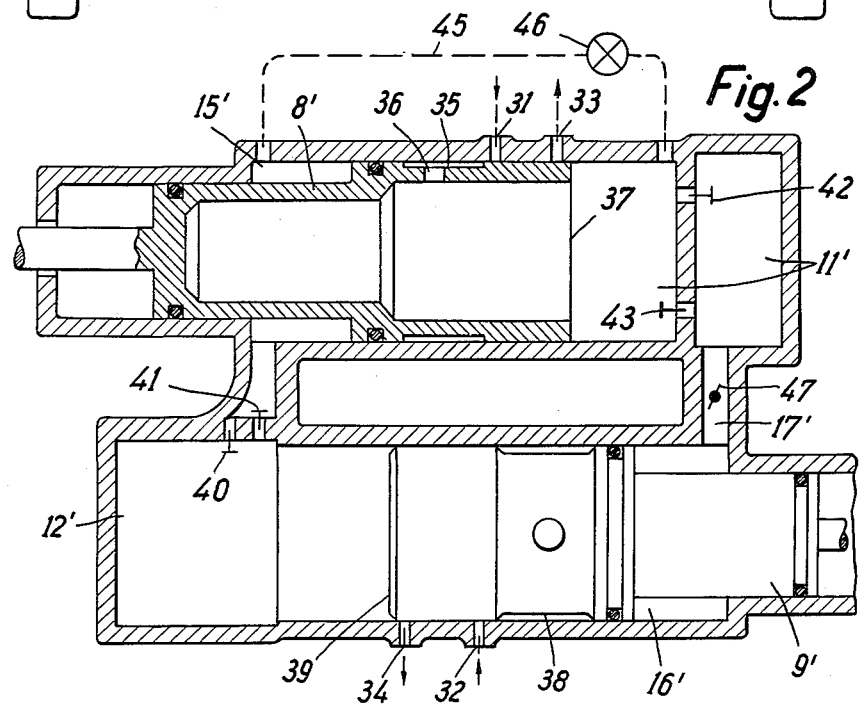
FIGURE 2 shows an enlarged cross section of a suspension unit similar to that shown in FIGURE 1, but provided with means controlled by the stepped pistons for returning the same to the control position.

FIGURE 2 illustrates a suspension unit similar to that of FIGURE 1, in which, however, the pressure in air cushions 11' and 12' will be adjusted to the respective loads and the stepped pistons 8' and 9' will be automatically returned to the central position, as shown. For this purposes, the cylinders containing pistons 8' and 9' are connected by passages 31 and 32 to a high-pressure container, not shown, and passages 33 and 34 to a low-pressure container, not shown. When the load increases so that, for example, piston 8' moves toward the right, passage 31 communicates with a control channel 35 in the piston so that additional air will enter through a passage 36 into work chamber 11' with the result that piston 8' will be returned to its central position. If, on the other hand, the load decreases and piston 8' moves toward the left, the front edge 37 thereof will open passage 33 so that air will be released from work chamber 11' and piston 8' will be returned to the central position. The same applies to work chamber 12' of piston 9' which is provided with corresponding passages 32 and 34, a channel 38, and a controlling front edge 39.

In the two embodiments of the inventions as illustrated in FIGURES 1 and 2, work chambers 11, 12, and 11', 12', respectively, may be filled with air or a suitable gas under a high pressure or partly with oil and partly with air or a gas under high pressure. For the purpose of damping minor vibrations, throttles 40, 41, 42, and 43 of any desired type may be provided at any suitable points of the suspension unit.

The modified embodiment of the invention as illustrated in FIGURE 3 shows a hydro-pneumatic suspension unit which employs both air and oil separately from each other as cushioning media in the form of an air cushion 50 which is separated from the oil 52 by a diaphragm 51. This embodiment also differs from those according to FIGURES 1 and 2 by the fact that the forces acting upon each wheel are transmitted hydraulically to the suspension unit 53 which is mounted on the car body, namely, by means of a piston 54 which is connected to the pivotable half-axle 55 and slidable within a cylinder 56 to displace the oil therefrom and force the same through a conduit 60 into the work chamber 57 of the cylinder containing the stepped piston 59 so as to act upon the smaller circular piston surface 58 thereof. An elevation adjustment in accordance with the load of the car is carried out by a control device 61 of a conventional type which is actuated by an arm 66 in such a manner that, when the half-axle 55 pivots toward the car body, oil will be forced from conduit 63 and thus into work chambers 57, whereas when half-axle 55 pivots away from the car body, oil will be discharged from chamber 57 through conduit 63, control device 61, and conduit 64. The differences in the oil contents in chambers 56, 60, and 57 are dependent upon the changing position of the stepped piston and the change in load. It is, however, also possible that differences in the volume of oil will occur by a thermal expansion of the oil, and also differences in the oil contents caused by leaks on piston 54 or other components. These differences will be likewise compensated. For the purpose of damping mionr vibrations, it is also possible to provide the suspension unit according to FIGURE 3 with throttling valves at any suitable points, for example, at points corrseponding to those at which valves 40, 41, 42, and 43 are located in FIGURE 2. The throttling valves may, however, also be installed in the direction of flow in cylinder 56, conduit 60, and chamber 57, for example, in the manner as indicated by the partition 65 which is provided with throttling valves of a conventional type.

The stepped pistons 59 and 67 are preferably returned automatically to their central position so that, in accordance with the changes in load they will have the same length of travel available in either direction from such a central point. Possible leaks between work chambers 57, 68, and 69 will thus also be compensated. Such return may be effected by means similar to those as indicated in FIGURE 2 or by filling control devices of a conventional type.

The suspension unit according to the further embodiment of the invention as illustrated in FIGURE 4 comprises a substantially cylindrical member 78 which is open toward the work chamber 88 and contains a piston 76 which is slidable therein and acted upon at both sides by biased springs 81 and 91 and carries a control rod 104 for actuating a slide valve in the form of a piston 105. This piston 76 is provided with a narrow throttling passage 77 and subjected to the oil pressure in chamber 88. The other end of spring 81 acts upon the stepped piston 71, and the other end of spring 91 upon the end wall 107. If the stepped piston 71 is moved toward the right, the tension of spring 81 will be increased, whereby the retarding piston 76 will be pressed slowly toward the right to move the channel 92 in control piston 105 into coincidence with the oil inlet passage 83. The oil will then pass through the hollow inside of control rod 104 and an aperture 86 into work chamber 88 and thereby force the stepped piston 71 back to its central position. Similarly, if piston 71 is moved from its central position toward the left, it will be returned to that position by the discharge of oil since spring 91 will then move the retarding piston 76 toward the left and thereby connect channel 92 with the oil outlet passage 93. When the stepped piston 71 is in the central position, as shown at the upper part of FIGURE 4, spring 81 which acts upon the end surface 106 of a tubular socket 80 will have a tension which is approximately twice as great as the tension of spring 91. If piston 71 moves toward the right from this central position and thereby takes along socket 80 by means of the flange 79, the difference in the tension of springs 81 and 91 will become immediately available for the use as a control force. If, however, the stepped piston 71 moves toward the left from the central position, socket 80 will remain connected to the retarding piston 76 by means of the head 103 on the extension of piston 76 in socket 80 so that the full force of spring 91 will then be available for the use as a control force. At the lower part of FIGURE 4, the stepped piston 95 is shown as being moved toward the right from the central position, and socket 98 remains rigidly connected to the retarding piston by head 97 so that spring 99 will be inactive, while the force of spring 100 will be fully effective. Channel 101 will then communicate with the outlet passage 102.

The spherical housing 110 comprises a second air cushion which acts on the oil contained in the work chamber 88 in parallel to the air cushion in the housing 108, whereby a stepped spring effect will be obtained by the result of different initial pressures existing in the main air cushion in housing 108 and in the second air cushion in housing 110 in a manner known per se. In the lower part of FIG. 4, the corresponding housing for a second air cushion is not illustrated by reason of simplification, only main air cushion housing 109.

The present invention is not limited to the particular embodiments as illustrated in the drawings, and particularly it is possible to combine these embodiments with each other. Thus, for example, the return movement of the stepped pistons according to FIGURE 4 to the central position may be combined with the elevation control by means of the control devices 61 according to FIGURE 3. In this manner it is possible to attain a pneumatic suspension which will compensate any deviation of the individual elements from their central position, as may be caused by changes in load or in temperature, or by losses due to leaks. It is also an important feature that the vibration-damping effect may be very easily adjusted from the outside, for example, by installing valves of a conventional type in conduits 60. Furthermore, these conduits 60 or the suspension unit itself may be provided with cooling ribs 70 or with a cooling jacket in order to dissipate the heat which is generated by the damping or cushioning operation. Such heat-exchanging surfaces may be utilized for warming up the suspension unit at low outside temperatures and for increasing the operating temperature thereof.

The work chambers 11 and 15 of the stepped piston 8 are shown in FIGURE 1 as not being in communication with each other. However, as indicated in FIGURE 2, they may also be connected to each other by a conduit 45 if it should be desired that the pressure in the two chambers be equalized, for example, in order to divide the load equally upon both wheels 2 and 3. This connecting conduit, which is indicated only on one cylinder of the suspension unit although it is to be similarly applied on both cylinders, should then be of a small cross section to attain a high flow resistance so that, when taking a curve, the stabilizing effect of the suspension unit will not be impaired. However, this conduit 45 may also be of a large cross section and a low flow resistance if a throttle valve 47 or the like is also inserted into the passage 17'. It is then possible to divide the combined suspension of the two wheels and attain independent suspensions for each wheel, in which the smaller circular surface of the stepped pistons 8' and 9' will form the effective piston surfaces. By the additional provision of suitable conventional means, not shown, which are acted upon by centrifugal force it is then possible to close the conduit 45 by a valve 46 and to open the passage 17', whereupon the full stabilizing action of the suspension unit will become immediately effective.

The form shown in FIG. 5 is similar to that of FIG. 3 but embodies the features of FIG. 2 insofar as parts 31 to 39 are concerned, these acting, as in the device of FIG. 2, to return the pistons at every stroke to the central position.

The form of FIG. 6 operates like that of FIG. 4, insofar as the return of the pistons to central position is concerned, but includes also the elevation adjustment control of FIG. 3, operating in the same manner.

Although this invention has been illustrated and described with reference to the preferred embodiments thereof, it should be understood that it is in no way limited to the details of such embodiments, but is capable of numerous modifications within the scope of the appended claims.

The invention having now been fully disclosed, what is claimed is:

1. In a fluid suspension for the opposite wheels of a motor vehicle mounted on the same axle which is divided into two pivotable half-axles, a central suspension unit comprising two cylinders each having a pair of work chambers therein, a stepped piston slidable within each pair of work chambers of each cylinder, a cushion of gas under pressure connected to each work chamber, each of said pistons having a smaller circular surface at one end, a larger circular surface at the other end, and an annular surface intermediate said ends, means for operatively connecting each half-axle to the smaller circular surface of one of said pistons, the annular surface of each piston in the corresponding annular work chamber being adapted to produce negative cushioning forces, the larger circular surface of each piston in the second work chamber being adapted to produce positive cushioning forces, communicating means connecting the annular work chamber of each cylinder with the second work chamber of the other cylinder containing the larger circular piston surface, each set of communicating work chambers being acted upon by one of said compressed gas cushions independently of the cushion action upon the other set of communicating work chambers, and independent means for each stepped piston for automatically returning such stepped piston to a central position after being shifted from said position by a pivoting movement of said half-axles.

2. In a fluid suspension as defined in claim 1, in which said work chambers themselves form said cushions and are filled with a gas under a high pressure.

3. In a fluid suspension as defined in claim 1, in which said work chambers are filled with oil acted upon by the pressure of said gas cushions, and in which partitioning means are provided for separating the oil and gas in said chambers and cushions, respectively.

4. In a fluid suspension as defined in claim 1, in which said returning means comprise control edges on said stepped pistons, and control channels in said pistons.

5. In a fluid suspension as defined in claim 1, in which said returning means comprise a separate control piston operatively associated with each of said stepped pistons.

6. A fluid suspension as defined in claim 5, in which said control piston is designed to form a retarding element, and at least two biased springs operatively connecting one of said stepped pistons to said control piston, both of said springs acting at one end upon said control piston, one of said springs acting at the other end upon said stepped piston and the other spring acting at the other end upon a stationary member.

7. A fluid suspension as defined in claim 6, in which one of said springs has a tension exceeding that of the other spring, said control piston having means thereon for positively connecting said control piston to said stepped piston and for thereby rendering said stronger spring ineffective when said stepped piston moves in one direction and adapted to be disconnected from said stepped piston to render said stronger spring effective when said stepped piston moves in the other direction.

8. A fluid suspension as defined in claim 7, in which throttle valves are installed in said suspension unit for damping the vibrations of said stepped pistons.

9. A fluid suspension as defined in claim 8, in which said valves are adjustable from the outside.

10. A fluid suspension as defined in claim 1, in which hydraulic means are interposed between each of said half-axles and each of said stepped pistons for transmitting the forces acting upon the wheel on each half-axle to said suspension unit.

11. A fluid suspension as defined in claim 10, in which throttle valves are installed in said hydraulic means for damping the vibrations of said half-axles.

12. A fluid suspension as defined in claim 10, in which control means are provided for regulating the amount of oil within said hydraulic means.

13. A fluid suspension as defined in claim 1, in which said suspension unit is provided with special heat-exchanging surfaces.

14. A fluid suspension as defined in claim 10, in which said hydraulic means are provided with special heat-exchanging surfaces.

15. A fluid suspension as defined in claim 1, in which means are provided for connecting the two work chambers of one stepped piston with each other to permit an equalization of pressure between said two work chambers.

16. A fluid suspension as defined in claim 15, in which at least one valve is interposed in said connecting means to permit an equalization of pressure between said two work chambers of one stepped piston only when said valve is opened.

17. A fluid suspension as defined in claim 16, in which further means are provided for interrupting the passage through said communicating means between said work chambers of one stepped piston with the work chambers of the other stepped piston when said valves in said connecting means are opened.

18. In a fluid suspension as claimed in claim 1, said cylinders being located side-by-side in parallel relation with the positive cushioning work chamber of one cylinder opposite the negative cushioning cylinder of the other work chamber.

19. In a fluid suspension as defined in claim 1, said returning means including means responsive to movement of the stepped piston to that side of the central position representing upward movement of the axle to connect the second work chamber to a source of high pressure and to movement of the stepped piston to the other side of the central position to connect the second work chamber to low pressure.

References Cited in the file of this patent

UNITED STATES PATENTS

| | | |
|---|---|---|
| 1,647,518 | Hawley | Nov. 1, 1927 |
| 2,757,376 | Brueder | July 31, 1956 |
| 2,953,393 | Lucien | Sept. 20, 1960 |

FOREIGN PATENTS

| | | |
|---|---|---|
| 447,445 | Germany | July 25, 1927 |
| 601,731 | Great Britain | May 12, 1948 |